March 8, 1960  W. H. BATEMAN  2,927,992
AUTOMATIC ELECTRIC ARC WELDING
Filed June 23, 1958  6 Sheets-Sheet 1

Inventor
William Henry Bateman
By Stanley Lightfoot
Attorney.

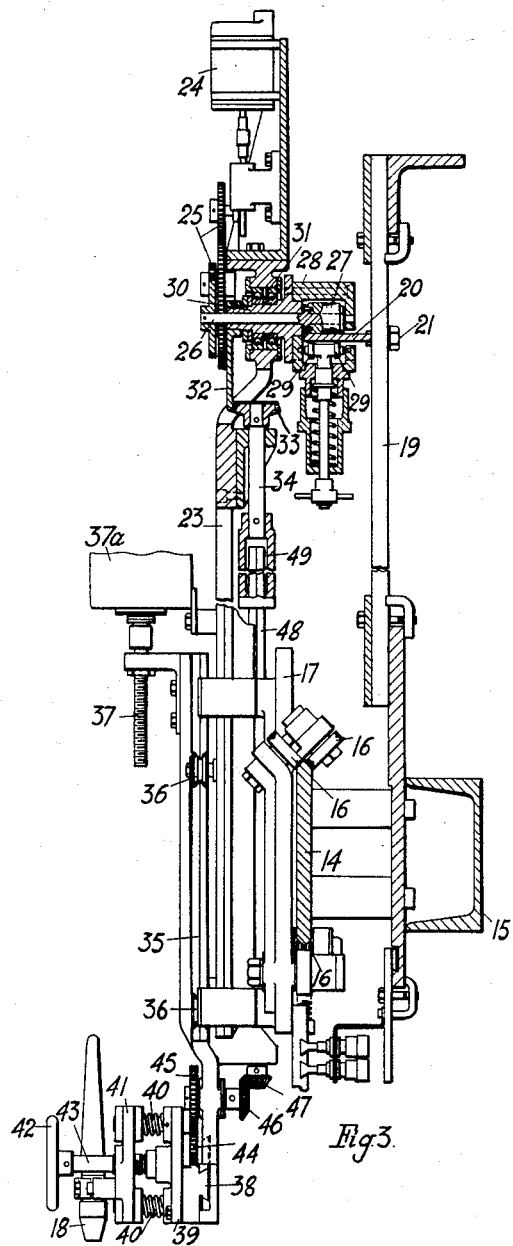

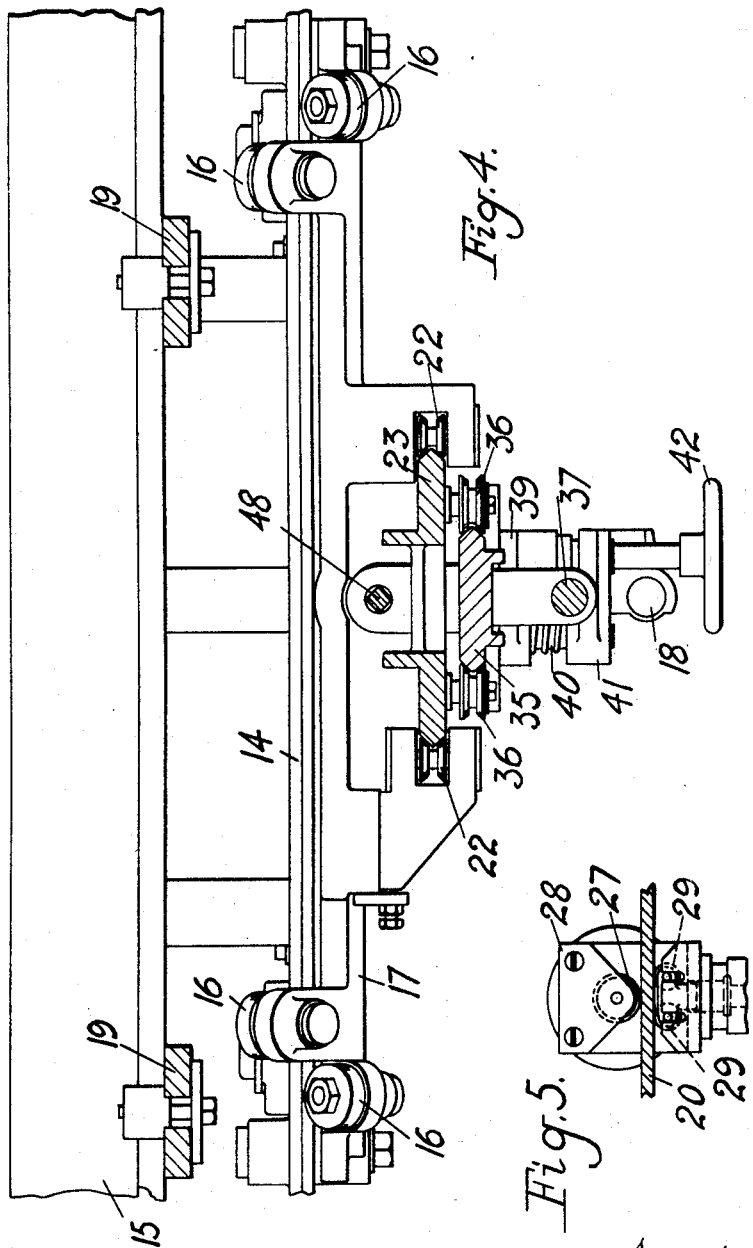

March 8, 1960 W. H. BATEMAN 2,927,992
AUTOMATIC ELECTRIC ARC WELDING
Filed June 23, 1958 6 Sheets-Sheet 5

Inventor.
William Henry Bateman
By Stanley Lightfoot
Attorney.

March 8, 1960 W. H. BATEMAN 2,927,992
AUTOMATIC ELECTRIC ARC WELDING
Filed June 23, 1958 6 Sheets-Sheet 6
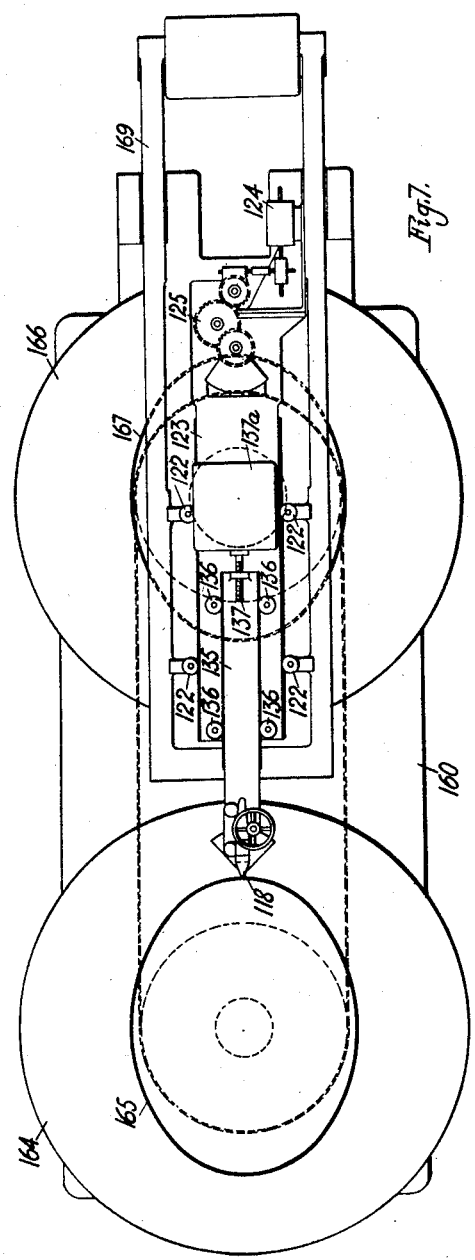
Inventor
William Henry Bateman
By Stanley Lightfoot
Attorney

United States Patent Office 2,927,992
Patented Mar. 8, 1960

2,927,992

AUTOMATIC ELECTRIC ARC WELDING

William Henry Bateman, Rickmansworth, England

Application June 23, 1958, Serial No. 743,689

18 Claims. (Cl. 219—125)

This invention relates to automatic arc welding, and has for its object to provide in a simple and convenient form a method and means whereby the arc can be caused to move at a uniform rate along a contoured part of a workpiece, and the axis of the arc electrode maintained substantially perpendicular to the workpiece surface.

A method according to the invention comprises employing a guide of substantially the same contour as the seam, and arranged separately from the workpiece, and utilising means interacting with the guide to impart relative movement at a constant rate to the arc and workpiece to maintain a constant relative disposition of the arc and workpiece.

A machine according to the invention comprises a guide of substantially the same contour as the seam in the workpiece and supported separately therefrom, and means co-operating with the guide for effecting relative movement of the arc and workpiece at a constant rate, and other means co-operating with the guide for maintaining a constant relative disposition of the arc and seam.

Examples of the invention will now be described with reference to the accompanying drawings in which:

Figure 3 is a part sectional view at right angles to Figure 2,

Figure 4 is a plan of Figure 2,

Figure 5 is a part sectional fragmentary view of the guide engaging rollers and associated parts, Figure 7 is a plan of Figure 6.

Figure 1:
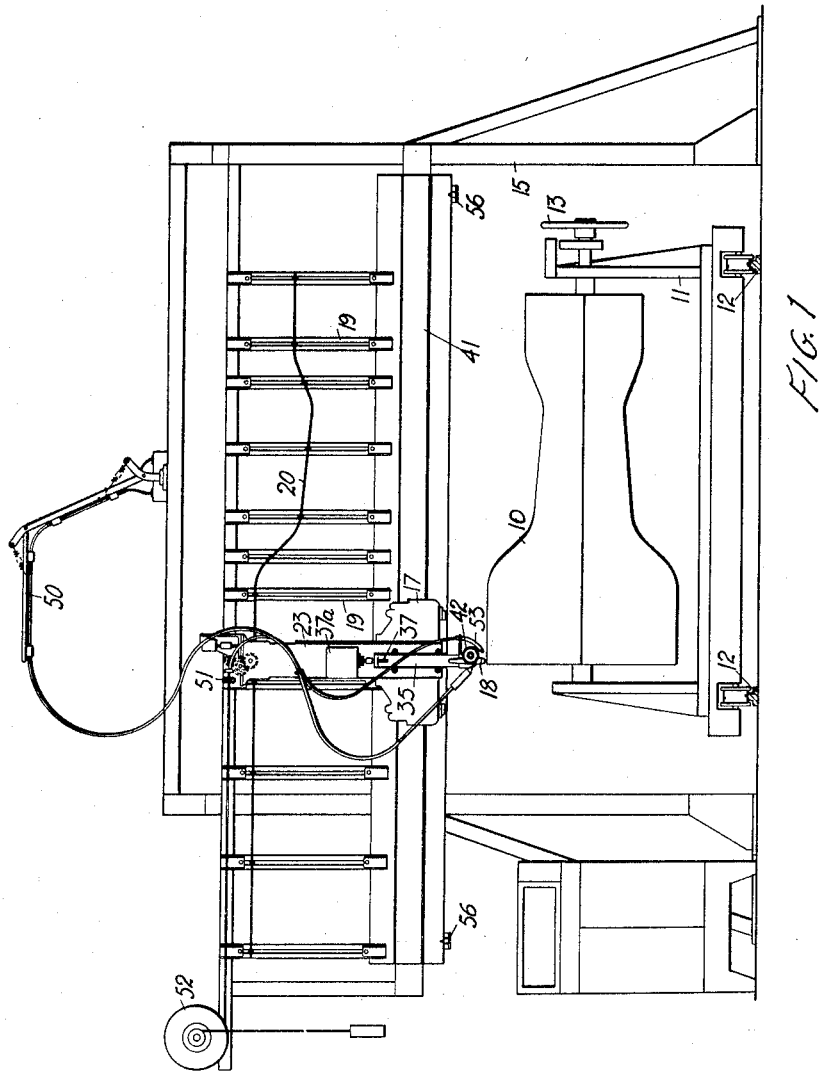
Figure 1 is a side elevation of one embodiment of the invention.
Figure 2:
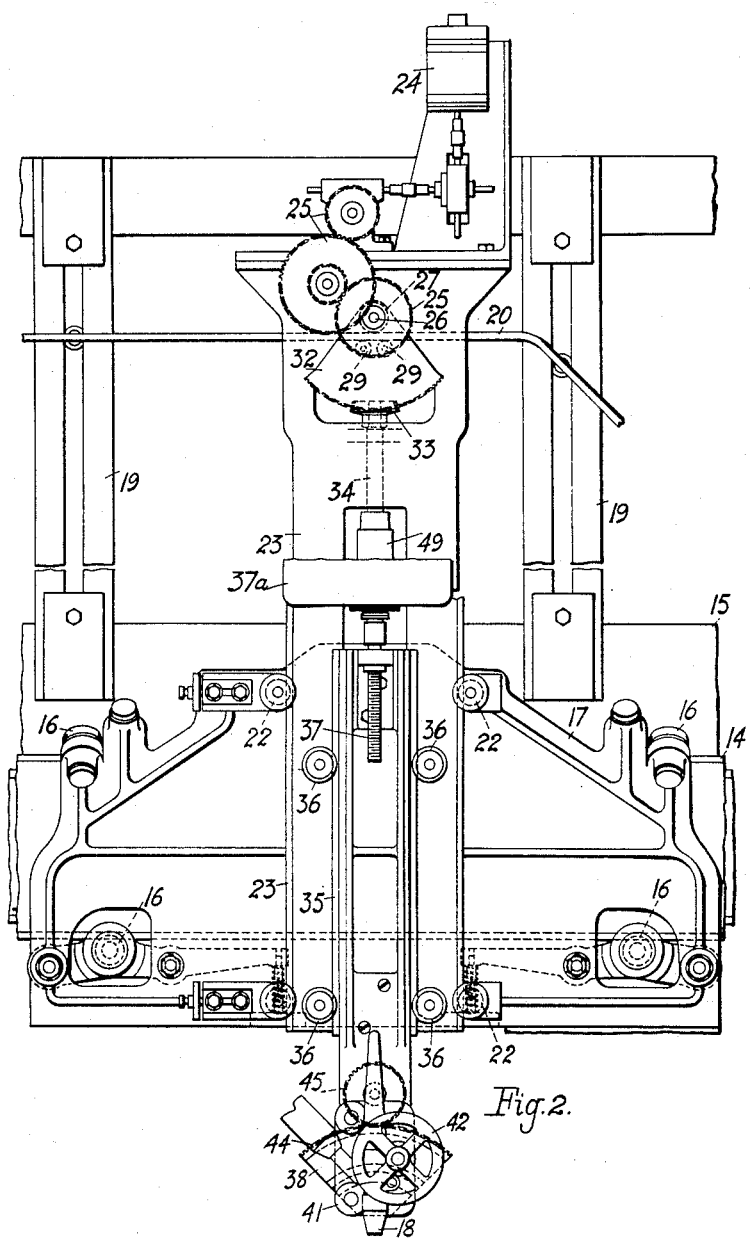
Figure 2 is an enlarged view of part of Figure 1.

Referring first to the machine shown in Figures 1 to 5 of the accompanying drawings the workpiece 10 incorporating the contoured seam which it is required to weld, is supported upon a carriage 11. This carriage is movable along transversely extending tracks 12, and includes a handle 13 whereby the workpiece can be moved angularly about its lonigtudinal axis to bring each in turn of a plurality of longitudinally extending and angularly spaced seams into the welding position.

Above the workpiece 10 is a horizontally extending straight guide rail 14 forming part of a frame 15. Mounted by means of rollers 16 on this rail 14 is a horizontally traversable carriage 17 which indirectly carries the welding torch 18, the latter conveniently being of the type employing a gas-shielded non-consumable electrode.

In the upper part of the frame 15 are a plurality of vertically extending and horizontally adjustable plates 19 which serve to support an adjustable guide 20. The latter consists of a strip of metal to one edge of which are secured screw-threaded studs 21 adapted to be engaged within vertical slots in the plates 19.

In use the portion of the guide 20 to be disposed vertically above the workpiece 10, is given a contour substantially equivalent to that of the seam on the workpiece, and such that the axis of a driving roller (to be referred to hereinafter) will (in moving along the guide) follow a path equivalent to the contour of the workpiece seam. Moreover, the guide 20 is clamped by means of bolts engaging the studs 21 in the slots in the plates 19 at a predetermined distance above the workpiece.

Mounted for vertical movement on the carriage 17 by means of rollers 22 is a main slide 23. At its upper end the slide 23 carries a variable speed electric motor 24 which through reduction gearing 25 is adapted to drive a spindle 26 carrying a driving roller 27 in nonslipping contact with the upper surface of the guide 20. The roller 27 is mounted in a housing 28 together with a pair of spaced pressure rollers 29 which are spring-urged into contact with the under surface of the guide 20. The rollers 27 and 29 occupy a triangular relationship as best seen in Figure 5, with the result that as rotation of the driving roller 27 causes the housing 28 to move along the guide 20, any departure from the horizontal in the track will not only cause the main slide 23 to move vertically, but will be accompanied by a partial rotation of the housing 28 about the axis of the roller 27 to accord with the inclination of the part of the guide 20 engaged by the rollers.

The housing 28 is provided with a horizontally projecting sleeve 30 surrounding the spindle 26. This sleeve is accommodated within an anti-friction bearing 31 in the main slide 23, and carries a toothed segment 32 in mesh with a pinion 33 at the upper end of a vertical shaft 34 carried by the slide 23.

On the main slide 23 is a secondary slide 35 which is mounted by means of guide rollers 36 on the main slide 23 for relative vertical movement. At its upper end the slide 35 has a part engaging a rotatable screw 37 extending from a mechanism generally designated 37ᵃ and responsive to voltage variations across the arc gap. The mechanism 37ᵃ "per se" forms no part of the present invention, and may be of known kind whereby a small change in the arc gap dimension accompanied by a difference in potential across the arc gap is caused to supply current to an electric motor to rotate the screw 37 in the appropriate direction, thereby raising or lowering the slide 35 relative to the slide 23 to restore the desired arc gap conditions.

Near the lower end of the slide 35 is formed an arcuate dovetail slot having a radius struck from a centre below the extremity of the slide, and at a position to be occupied by the arcing end of the torch electrode. In this arcuate slot is engaged a complementary arcuate projection 38 on a part secured to a plate 39. The plate 39 carries laterally extending pins 40 engaging in holes in a relatively slidable and parallel plate 41 on which the torch 18 is mounted. By means of a handwheel 42 on a screw threaded shaft 43 the plate 41 can be moved towards, or away from the plate 39 to align the torch 18 accurately with a seam on the workpiece.

On the plate 39 is a quadrant 44 which is in mesh with a pinion 45 carried by a short spindle extending through the slide 35. This spindle carries at its other end a bevel pinion 46 which is in mesh with a bevel pinion 47 at the lower end of a vertical shaft 48 carried by the slide 35. The shaft 48 is co-axial with the shaft 34, and is coupled thereto by a coupling 49 which will permit of relative axial movements of the two shafts to allow for relative movements of the slides 23, 35.

The welding current and shielding gas are supplied to the electrode of the torch by means of a cable and tube which are supported by a pair of pivotal and spring-counterbalanced arms 50 so as to retain the cable and tube in the correct relative position during traverse of the carriage 17. Moreover, when it is desired to supply a filler wire to the arc for provision of additional welding metal, a pair of pinch rollers 51 is mounted on the slide 23 for feeding such wire from a reel 52 to a guide tube 53 in the region of the arc. One of the rollers 51 is driven from one of the gears 22, and by this means the filler wire is fed proportionately to the length of the seam.

Any convenient means (not shown) may be incorporated for relieving the guide 20 of the weight of the slides 23 and 35 and the parts supported by them.

Limit switches 56 may be associated with the guide rail 14 in positions to be actuated by the carriage 17 near the limit of its travel so that a repeatable cycle of operations may be conducted automatically.

Assuming that it is required to weld a seam along the upper surface of the contoured workpiece 10, and that the carriage 17 occupies a position to the left of the workpiece as viewed in Figure 1, as soon as the machine is set in operation the friction roller 27 will be driven by the motor 24 to cause the carriage 17 together with the slides 23, 35 to be traversed to the right, as viewed in this Figure 1. When the welding torch comes into register with the workpiece (which serves as the other electrode) the welding arc will be struck and the mechanism 37ª will adjust the slide 35 vertically to provide the required arc conditions. When the driving roller 27, and the pair of guide rollers 29 make contact with an inclined, or curved portion of the guide 20, an angular movement will be imparted to the housing 28. A corresponding angular movement will then be imparted to the torch through the quadrant 32, pinion 33, shafts 34, 48, pinions 47, 46 and 45, and the segment 44 thereby substantially maintaining the required angular setting of the welding torch relative to the surface of the workpiece at all times. Moreover, as the housing 28 moves vertically to follow the contour of the guide 20 a corresponding vertical movement will be imparted to the slides 23, 35 thereby maintaining the required arc gap between the welding torch and the workpiece surface. Furthermore, the welding torch will move at a substantially constant speed relative to the surface of the workpiece provided that the speed of the motor 21 is maintained constant.

Figure 6:
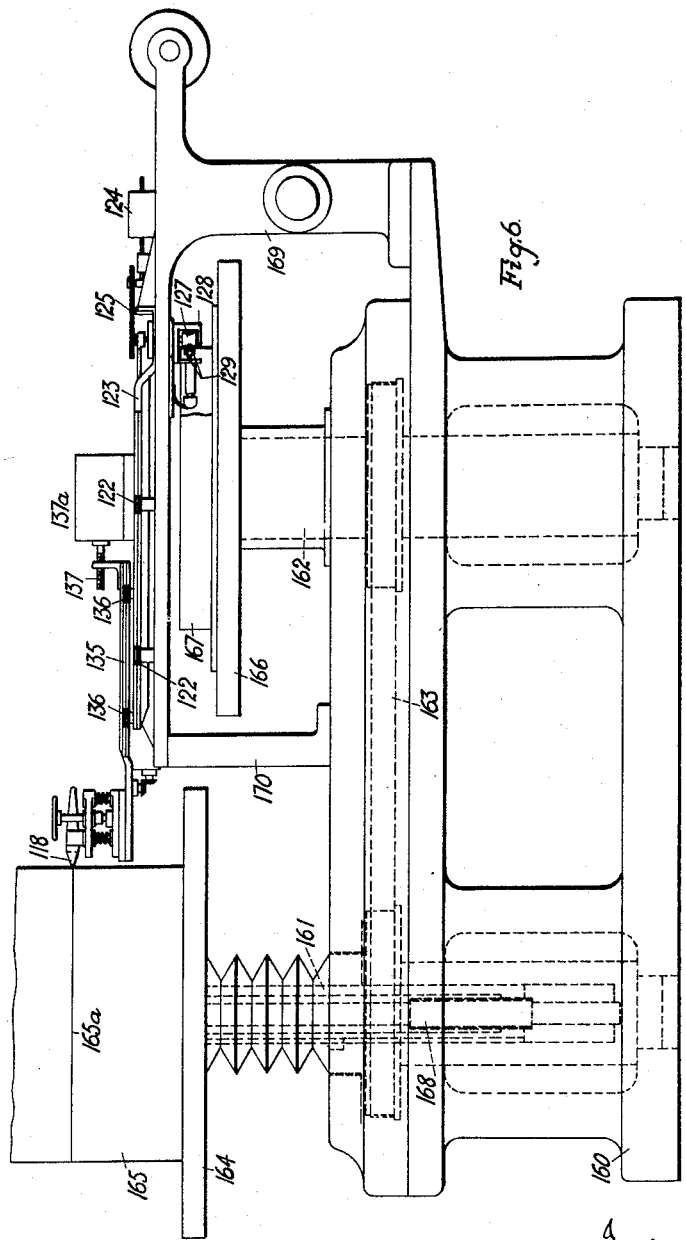
Figure 6 is a side elevation of another embodiment of the invention.

The embodiment of the invention illustrated in Figures 6 and 7 is intended for welding circumferential seams on hollow sheet metal workpieces, and operates in essentially the same manner as the first embodiment described. For this reason in the following description of Figures 6 and 7 parts equivalent to parts shown in Figures 1 to 5 will be given the same references with the prefix 1.

In a base 160 are mounted a pair of vertical shafts 161, 162 which are interconnected by an endless band 163, chain, or other means for effecting their rotation at equal speeds. On the upper end of the shaft 161 is a table 164 for supporting the workpiece 165 incorporating the seam 165ª to be welded, whilst on the upper end of the shaft 162 is a table 166 to which is secured a guide 167. The latter consists of a strip shaped to substantially the same contour as the workpiece, but of slightly smaller size by an amount equal to the radius of a driving roller 127. Moreover, associated with the shaft 161 is screw, or other means 168 whereby the height of the table 164 can be adjusted to align the seam 165ª with the welding torch 118.

On one end of the base 160 is a pivotal and counter weighted frame 169 which is in the operative position (shown in the drawings) extends horizontally across the guide 167, and rests at its free end upon an abutment 170 on the base. This frame can be moved about its pivot to an inoperative position to admit of changing of the workpiece 165 and/or guide 167.

On the frame 169 is mounted a main slide 123 which is guided for horizontal movement by rollers 122 on the frame 169. The slide 123 carries at one end a variable speed electric motor 124 which through gearing 125 drives the driving roller 127 in frictional engagement with the outer surface of the guide 167. The driving roller 127 is mounted together with a pair of spaced and spring-loaded rollers 129 in a housing 128. The rollers 127, 129 co-operate with the guide 167 in an exactly similar manner to that described with reference to Figures 1 to 5. Also angular movement of the housing 128 will impart corresponding angular movement to the torch 118 in the same manner as in the first embodiment described. Moreover the torch 118 is carried by a secondary slide 135 which is adjustable horizontally relative to the main slide 123 by mechanism 137ª, the slide 135 being guided by rollers 136 and having a part engaging a screw 137 extending from the mechanism 137ª.

In this embodiment rotation of the roller 127 by the motor 124 will by its frictional engagement with the guide 167 cause the table 166 to rotate, with the result that the table 164 also will be rotated at an equal speed. When the guide 167 is of non-circular form, its rotation will impart longitudinal movement to the main slide 123 to maintain the required arc gap dimension, and also angular movement of the housing 128 to maintain the torch 118 at the correct angular setting relative to the surface of the workpiece.

It will be apparent that a machine in accordance with this second embodiment can be used for welding circumferential seams on workpieces of circular, elliptical, polygonal or other section, and in all cases the peripheral speed of the workpiece relative to the electrode is maintained constant, thus ensuring uniformity of the weld.

The invention is not limited to the examples above described, and may be adapted for use with consumable electrodes, and to suit different types of workpieces. However, in all cases means interacting with a guide having a contour substantially equivalent to the seam is utilised to impart relative movement to the welding torch and workpiece to maintain their relative dispositions.

Having thus described my invention what I claim as new and desire to secure by Letters Patent is:

1. A machine for effecting automatically the welding of a contoured seam in a workpiece by means of an electric arc, comprising a guide supported separately from the workpiece, an angularly movable arc electrode carrier, a driving roller engageable with one surface of the guide, means for rotating the driving roller in engagement with said surface at a constant rate to impart thereby relative movement to said carrier and the workpiece, the contour of the guide being substantially equivalent to that of the seam and such that the rotation axis of the roller will follow a path equivalent to the path of said seam, an angularly movable housing in which the driving roller is mounted, and a first means carried by the housing to bear on the opposite surface of the guide in two closely-spaced planes parallel with an intervening plane containing the said axis, a second means supported by the housing for maintaining equispaced from said axis the incidence of contact of the first means and the guide and for urging the contact, and means for translating movements of the housing into corresponding movements of said carrier.

2. A machine as claimed in claim 1, wherein the said first means is formed so as to make line-contact with the guide.

3. A machine as claimed in claim 2, wherein the said first means consists of an assembly of free rollers arranged in mutually fixed spaced relationship for tandem rolling engagement with said opposite surface and mounted in the housing to permit under the action of the said second means limited freedom of movement of the free roller assembly toward the said opposite surface.

4. A machine as claimed in claim 3, wherein the housing has a pivot axis corresponding with the rotation axis of the driving roller.

5. A machine as claimed in claim 4, wherein is provided a yoke for the free roller assembly such that the rotation axes of the free rollers are carried parallel with the rotation axis of the driving roller.

6. A machine as claimed in claim 5, wherein the said second means includes a spring arranged to urge the free roller assembly equally in the direction of the driving roller axis.

7. A machine for effecting automatically the welding of a contoured seam in a workpiece by means of an electric arc, comprising a frame, a guide supported separately from the workpiece, means for securing the guide to the frame, a horizontal track on the frame, a carriage traversable along the track, a main slide upon the carriage and arranged for movement towards and away from the workpiece, an angularly movable housing upon the slide, a driving roller mounted therein, an electric motor upon the slide for driving the roller at constant rate, the roller being engageable with one surface of the guide, the contour of the guide being substantially equivalent to that of the seam to be welded and such that the rotation axis of said roller will follow a path equivalent to the path of said seam, a secondary slide on the main slide, mechanism for moving the secondary slide in response to voltage variations across the arc gap, an angularly movable arc electrode carrier upon the secondary slide, rotation of the roller upon the guide surface imparting movement to said housing and corresponding movement to the main slide, means for translating angular movements of the housing into corresponding movements of said carrier, a first means carried on the housing for movement therewith and for bearing on the opposite surface of the guide in two closely-spaced planes parallel to an intervening plane containing the said axis, a second means supported by the housing for maintaining equispaced from said axis the incidence of contact between the first means and the guide, and for urging the contact.

8. A machine as claimed in claim 7, wherein the said first means is formed so as to make line-contact with the guide.

9. A machine as claimed in claim 8, wherein the said first means consists of an assembly of free rollers arranged in mutually fixed spaced relationship for tandem rolling engagement with said opposite surface and mounted in the housing to permit under the action of the said second means limited freedom of movement of the free roller assembly toward the said opposite surface.

10. A machine as claimed in claim 9, wherein the housing has a pivot axis corresponding with the rotation axis of the driving roller.

11. A machine as claimed in claim 10, wherein is provided a yoke for the free roller assembly such that the rotation axes of the free rollers are carried parallel with the rotation axis of the driving roller.

12. A machine as claimed in claim 11, wherein the said second means includes a spring arranged to urge the free roller assembly equally in the direction of the driving roller axis.

13. A machine for effecting automatically the welding of a contoured seam in a workpiece by means of an electric arc, comprising a base having thereupon a rotary workholder and a rotary table on laterally spaced axes of rotation, drive means between the holder and table providing their rotation at equal speeds, a guide supported on the table, a support for bridging the table and mounted on the base, a main slide on the support, a secondary slide upon the main slide, an angulary movable arc electrode carrier upon the secondary slide, mechanism for moving the secondary slide in response to voltage variations across the arc gap, an angularly movable housing upon the main slide, a driving roller mounted therein, an electric motor upon the main slide for driving the roller at constant rate, the roller being engageable with one surface of the guide, the contour of the guide being substantially equivalent to that of the seam to be welded and such that the rotation axis of said roller will follow a path equivalent to the path of said seam, rotation of the roller upon the guide surface imparting rotation to the table and movement to said housing and corresponding movement to the main slide, means for translating angular movements of the housing into corresponding movements of said carrier, a first means carried on the housing for movement therewith and for bearing on the opposite surface of the guide in two closely-spaced planes parallel to an intervening plane containing the said axis, a second means supported by the housing for maintaining equispaced from said axis the incidence of contact between the first means and the guide, and for urging the contact.

14. A machine as claimed in claim 13, wherein the said first means is formed so as to make line-contact with the guide.

15. A machine as claimed in claim 14, wherein the said first means consists of an assembly of free rollers arranged in mutually fixed spaced relationship for tandem rolling engagement with said opposite surface and mounted in the housing to permit under the action of the said second means limited freedom of movement of the free roller assembly toward the said opposite surface.

16. A machine as claimed in claim 15, wherein the housing has a pivot axis corresponding with the rotation axis of the driving roller.

17. A machine as claimed in claim 16, wherein is provided a yoke for the free roller assembly such that the rotation axes of the free rollers are carried parallel with the rotation axis of the driving roller.

18. A machine as claimed in claim 17, wherein the said second means includes a spring arranged to urge the free roller assembly equally in the direction of the driving roller axis.

References Cited in the file of this patent

UNITED STATES PATENTS

| | | |
|---|---|---|
| 1,712,114 | Kjekstad | May 7, 1929 |
| 1,884,644 | Ford | Oct. 25, 1932 |
| 1,957,489 | Comstock | May 8, 1934 |
| 1,978,042 | Dodge | Oct. 23, 1934 |
| 1,983,321 | Stephens et al. | Dec. 4, 1934 |
| 2,030,689 | Dorrat | Feb. 11, 1936 |
| 2,068,166 | Dodge | Jan. 19, 1937 |
| 2,522,146 | Tichenor et al. | Sept. 12, 1950 |